United States Patent
Ozawa et al.

(10) Patent No.: US 10,053,592 B2
(45) Date of Patent: Aug. 21, 2018

(54) INK SET FOR INKJET RECORDING, CARTRIDGE, AND IMAGE FORMING METHOD

(71) Applicant: KYOCERA Document Solutions Inc., Osaka (JP)

(72) Inventors: Noriaki Ozawa, Osaka (JP); Yasuko Takaori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/796,090

(22) Filed: Oct. 27, 2017

(65) Prior Publication Data

US 2018/0148591 A1 May 31, 2018

(30) Foreign Application Priority Data

Nov. 25, 2016 (JP) .................................. 2016-229066

(51) Int. Cl.
| | |
|---|---|
| *C09D 11/40* | (2014.01) |
| *B41J 2/165* | (2006.01) |
| *C09D 11/322* | (2014.01) |
| *C09D 11/38* | (2014.01) |
| *C09D 11/54* | (2014.01) |

(52) U.S. Cl.
CPC ........... *C09D 11/40* (2013.01); *B41J 2/16552* (2013.01); *C09D 11/322* (2013.01); *C09D 11/38* (2013.01); *C09D 11/54* (2013.01)

(58) Field of Classification Search
CPC ......... C09D 11/40; C09D 11/54; C09D 11/38; C09D 11/322; B41J 2/16552
See application file for complete search history.

(56) References Cited

U.S. PATENT DOCUMENTS

| | | | |
|---|---|---|---|
| 8,741,049 B2 * | 6/2014 | Saito .................... | C09D 11/326 106/31.6 |
| 2017/0183522 A1 * | 6/2017 | Chaffins, Jr. ......... | C09D 11/322 |
| 2018/0147851 A1 * | 5/2018 | Takaori ................ | B41J 2/16552 |

FOREIGN PATENT DOCUMENTS

JP 2013-146964 A 8/2013

* cited by examiner

*Primary Examiner* — Julian Huffman
*Assistant Examiner* — Michael Konczal
(74) *Attorney, Agent, or Firm* — Studebaker & Brackett PC

(57) ABSTRACT

An ink set includes a water-based ink and a water-based cleaning liquid. The water-based ink and the water-based cleaning liquid each contain at least 1.0% by mass and no greater than 4.0% by mass of a deliquescent agent. The water-based cleaning liquid further contains a nonionic surfactant and a diol. The deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin. The nonionic surfactant has an HLB value determined by Griffin method of at least 14 and no greater than 16. The diol includes at least one of triethylene glycol and 1,3-propanediol.

7 Claims, 3 Drawing Sheets

INK SET FOR INKJET RECORDING, CARTRIDGE, AND IMAGE FORMING METHOD

INCORPORATION BY REFERENCE

The present application claims priority under 35 U.S.C. § 119 to Japanese Patent Application No. 2016-229066, filed on Nov. 25, 2016. The contents of this application are incorporated herein by reference in their entirety.

BACKGROUND

The present disclosure relates to an ink set for inkjet recording, a cartridge, and an image forming method.

The following method has been known that is an image forming method to which an inkjet method is adopted. First, inkjet recording ink (also referred to below simply as "ink") is discharged from a discharge surface of a recording head toward a recording medium. Next, maintenance liquid is supplied to the discharge surface.

SUMMARY

An ink set for inkjet recording according to the present disclosure includes a water-based ink and a water-based cleaning liquid. The water-based ink and the water-based cleaning liquid each contain at least 1.0% by mass and no greater than 4.0% by mass of a deliquescent agent. The water-based cleaning liquid further contains a nonionic surfactant and a diol. The deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin. The nonionic surfactant has an HLB value determined by Griffin method of at least 14 and no greater than 16. The diol includes at least one of triethylene glycol and 1,3-propanediol.

A cartridge according to the present disclosure includes the above ink set for inkjet recording, a first tank that accommodates the water-based ink, and a second tank that accommodates the water-based cleaning liquid.

An image forming method according to the present disclosure includes: discharging a water-based ink toward a recording medium from a discharge surface of a recording head; supplying a water-based cleaning liquid to the discharge surface; performing purging in a manner that the water-based ink is pressurized to be discharged from the discharge surface; and wiping the discharge surface. The supplying and the purging are performed after the discharging and before the wiping. The water-based ink and the water-based cleaning liquid each contain at least 1.0% by mass and no greater than 4.0% by mass of a deliquescent agent. The water-based cleaning liquid further contains a nonionic surfactant and a diol. The deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin. The nonionic surfactant has an HLB value determined by Griffin method of at least 14 and no greater than 16. The diol includes at least one of triethylene glycol and 1,3-propanediol.

DETAILED DESCRIPTION

Figure 1:
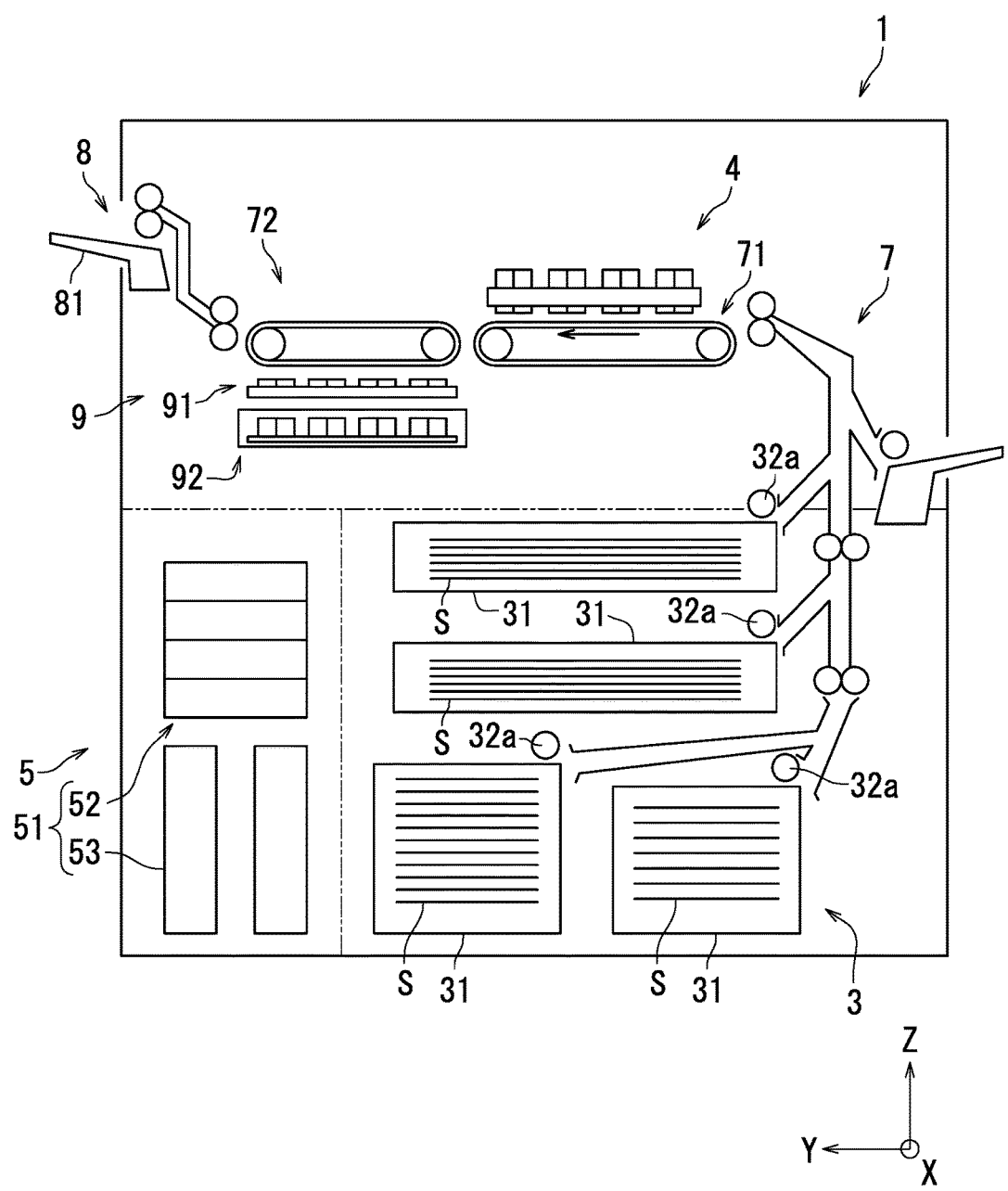
FIG. 1 illustrates an example of configuration of an image forming apparatus to which an image forming method according to the present disclosure is adopted.

The following describes an embodiment of the present disclosure. Note that unless otherwise stated, evaluation results (for example, values indicating shape or physical properties) of a powder each are a number average of values measured for an appropriate number of particles of the powder. A measured value of a volume median diameter ($D_{50}$) of a powder is a value measured based on Coulter principle (an electric sensing zone method) using "Coulter Counter Multisizer 3" produced by Beckman Coulter, Inc., unless otherwise stated.

Also note that in the present description the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. In the present description, the term "(meth)acryl" is used as a generic term for both acryl and methacryl.

[Ink Set for Inkjet Recording According to Present Embodiment]

An ink set for inkjet recording (also referred to below simply as an "ink set") according to the present embodiment includes a water-based ink and a water-based cleaning liquid. The water-based ink and the water-based cleaning liquid each contain at least 1.0% by mass and no greater than 4.0% by mass of a deliquescent agent. The water-based cleaning liquid further contains a nonionic surfactant and a diol. The deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin. The nonionic surfactant has a hydrophilic-lipophilic balance (HLB) value determined by Griffin method of at least 14 and no greater than 16. The diol includes at least one of triethylene glycol and 1,3-propanediol.

The HLB value of the nonionic surfactant determined by Griffin method (also referred to below simply as an "HLB value") herein is defined by the following expression.

(HLB value)=20×total sum of formula weights of hydrophilic portions)/(molecular weight)

The "nonionic surfactant that the water-based cleaning liquid contains" may be referred to below as a "nonionic surfactant (HLB value: 14 to 16)".

In a situation in which the deliquescent agent that the water-based ink contains and the deliquescent agent that the water-based cleaning liquid contains are distinguished from each other, the "deliquescent agent that the water-based ink contains" is referred to as a "first deliquescent agent" and the "deliquescent agent that the water-based cleaning liquid contains" is referred to as a "second deliquescent agent". In a situation in which the deliquescent agent that the water-based ink contains and the deliquescent agent that the water-based cleaning liquid contains are not distinguished from each other, they are referred simply as "deliquescent agents".

The following method can be employed for example as a method for forming an image with use of an ink set. Specifically, the water-based ink included in the ink set is first discharged from an discharge surface of a recording head (recording head included in the inkjet recording apparatus) toward a recording medium. More specifically, the water-based ink is discharged from multiple discharge ports formed in the discharge surface toward the recording medium. The water-based cleaning liquid included in the ink set is supplied to the discharge surface and a purging operation is performed. The purging operation may be performed after supply of the water-based cleaning liquid to the discharge surface. Alternatively, the water-based cleaning liquid may be supplied to the discharge surface after the purging operation. The water-based ink is pressurized to be discharged from the discharge ports in the purging operation. Ink discharged in the purging operation will be referred to below as "purged ink". Thereafter, a wiping operation is performed. The discharge surface is wiped in the wiping operation.

Discharging the water-based ink from the discharge surface of the recording head toward the recording medium may contaminate the discharge surface with the water-based ink. A solvent component contained in the water-based ink tends to evaporate more readily than that contained in a non-water-based ink. As such, the water-based ink is more readily dried on the discharge surface than the non-water-based ink, and therefore, tends to adhere to the discharge surface. When the water-based ink adheres to the discharge surface, ink adhering thereto (also referred to below as "adhering ink") may block the discharge ports. As a result, ink discharge failure may occur. For example, ink is hardly discharged. Alternatively, ink may be discharged in an undesired discharge direction.

In view of the foregoing, the ink set according to the present embodiment has the above features. Therefore, an image can be formed without involving occurrence of ink discharge failure in image formation with use of the ink set according to the present embodiment. The following first describes typical configuration of a water-based ink and an adhering ink forming process in order for the sake of explanation.

<Typical Configuration of Water-Based Ink>

The water-based ink contains an aqueous solvent and a pigment dispersion. The pigment dispersion refers to an aqueous solvent in which a plurality of pigment particles are dispersed. The pigment particles each include a pigment core containing a pigment and a resin cover disposed on a surface of the pigment core.

The pigment particles are dispersed in the water-based ink. Specifically, a resin salt is used as the resin cover in many cases. The resin salt herein has within a molecule thereof a functional group capable of being ionized, for example, COONa. The water-based ink contains a sufficient amount of an aqueous solvent. For the reasons as above, electrolytic dissociation tends to readily occur on the surface of the resin cover. An electric dual layer is accordingly formed on the surface of the resin cover. In a configuration for example in which a resin salt having a COONa group within a molecule thereof is used as a material of the resin cover, the surface of the resin cover is negatively charged ($COO^-$) and $Na^+$ is accordingly attached to the surface of the resin cover by electric attraction. When the electric dual layer is formed on the surface of the resin cover, the pigment particles electrically repel one another. As a result, the pigment particles are dispersed.

<Adhering Ink Forming Process>

The adhering ink is thought to be formed through the following process.

When the water-based ink is discharged from the discharge surface of the recording head toward a recording medium, the water-based ink may be attached to the discharge surface. When the water-based ink is attached to the discharge surface, the water-based ink comes in contact with the air to be dried. When the water-based ink is dried, the resin cover tends to form a film.

Specifically, when the water-based ink is dried, the amount of the aqueous solvent in the water-based ink decreases with a result that electrolytic dissociation hardly occurs on the surface of the resin cover. In such a situation, the pigment particles hardly repel one another and accordingly tend to agglomerate together. Typically, the pigment particles each include a pigment core and a resin cover on the surface of the pigment core (see <Typical Configuration of Water-based Ink> described above). In the above configuration, when the pigment particles agglomerate together, the resin covers present on the respective surfaces of different pigment cores tend to be in contact with one another. As a result, a film of the resin covers also referred to below as a "resin film.") tends to be formed. As described above, when the water-based ink is dried, agglomerate of the pigment cores is covered with the resin film. In a manner as above, the adhering ink is formed.

<Reason Why Occurrence of Ink Discharge Failure Can be Prevented>

The following describes in detail possible factors of the reason why occurrence of ink discharge failure can be prevented in image formation with use of the ink set according to the present embodiment.

As described above in <Adhering Ink Formation Process>, the surface of the adhering ink forms the resin film. The resin film herein is made from the resin covers and the resin salt is usually used as a material of the resin cover. In a configuration in which the resin salt is used as a material of the resin cover, electrolytic dissociation tends to occur on the surface of the adhering ink when the adhering ink is in contact with a liquid containing an aqueous solvent (e.g., the water-based cleaning liquid). When the water-based cleaning liquid is supplied to the discharge surface of the recording head in the above situation, the surface of the adhering ink tends to be hydrophilic.

The water-based cleaning liquid contains a nonionic surfactant (HLB value: 14 to 16) in the present embodiment. The nonionic surfactant herein becomes more hydrophobic as the HLB value is decreased and more hydrophilic as the HLB value is increased. Furthermore, as described above, when the water-based cleaning liquid is supplied to the discharge surface, the surface of the adhering ink tends to be hydrophilic. From the above reasons, the followings are expected.

The nonionic surfactant having an HLB value of less than 14 (also referred to below as a "nonionic surfactant of the first comparative example") is highly hydrophobic. Accordingly, even when a water-based cleaning liquid containing the nonionic surfactant of the first comparative example is supplied to the discharge surface, the nonionic surfactant of the first comparative example does not exhibit affinity to the surface of the adhering ink. Therefore, the nonionic surfactant of the first comparative example is hardly present in the vicinity of the surface of the adhering ink.

The nonionic surfactant having an HLB value of greater than 16 (also referred to below as a "nonionic surfactant of the second comparative example") is highly hydrophilic. Accordingly, when a water-based cleaning liquid containing the nonionic surfactant of the second comparative example is supplied to the discharge surface, the nonionic surfactant of the second comparative example exhibits significantly high affinity to the surface of the adhering ink. Therefore, the nonionic surfactant of the second comparative example enters inside the adhering ink through the surface of the adhering ink.

By contrast, the nonionic surfactant (HLB value: 14 to 16) is well balanced between hydrophobicity and hydrophilicity. Accordingly, when the water-based cleaning liquid in the present embodiment is supplied to the discharge surface, the nonionic surfactant (HLB value: 14 to 16) exhibits appropriate affinity to the surface of the adhering ink. Therefore, the nonionic surfactant (HLB value: 14 to 16) can be present in the vicinity of the surface of the adhering ink and can be present there by priority to the inside of the adhering ink. Consequently, the state of the surface of the adhering ink can readily vary. More specifically, a liquid (e.g., the water-based cleaning liquid or the water-based ink) is allowed to readily enter inside the adhering ink from the outside of the adhering ink.

The water-based cleaning liquid in the present embodiment contains the second deliquescent agent. The second deliquescent agent herein, which is deliquescent, readily absorbs moisture to be liquefied. Further, as discussed above, the purged ink is the water-based ink. For the reasons as above, when the water-based cleaning liquid is supplied to the discharge surface and the purging operation is performed, the purged ink are readily absorbed into the second deliquescent agent. When the water-based cleaning liquid enters inside the adhering ink from the outside of the adhering ink as above, the purged ink absorbed in the water-based cleaning liquid (specifically, the purged ink absorbed in the second deliquescent agent contained in the water-based cleaning liquid) can readily enter inside the adhering ink from the outside of the adhering ink.

The water-based ink in the present embodiment contains the first deliquescent agent. The adhering ink herein is ink as a result of water-based ink drying. Therefore, in a configuration in which the water-based ink contains the first deliquescent agent, the adhering ink also contains the first deliquescent agent. The first deliquescent agent, which is deliquescent, readily absorbs moisture to be liquefied. For the reasons as above, the adhering ink readily absorbs the purged ink. The purged ink can readily enter inside the adhering ink from the outside of the adhering ink also for the reason as above.

As described above, the purged ink readily enters inside the adhering ink from the outside of the adhering ink in the present embodiment. Accordingly, when the water-based cleaning liquid is supplied to the discharge surface of the recording head and the purging operation is performed, the adhering ink is readily dissolved in the purged ink. As such, when the wiping operation is performed after the water-based cleaning liquid is supplied to the discharge surface and the purging operation is performed, the adhering ink can be easily removed from the discharge surface. As a result, occurrence of ink discharge failure can be prevented.

It is expected that occurrence of ink discharge failure can be prevented in the present embodiment for the reasons described above. Therefore, occurrence of ink discharge failure can be prevented independent of the chemical structure of the nonionic surfactant (HLB value: 14 to 16), for example, even in a configuration in which the nonionic surfactant (HLB value: 14 to 16) has no amino group in a molecule thereof. Accordingly, a material of the nonionic surfactant (HLB value: 14 to 16) can be selected from a wide variety of materials.

Impairment of adhering ink wiping performance in the wiping operation can be prevented when the ink set according to the present embodiment, which has the above features, is used. This can achieve efficient removal of the adhering ink from the discharge surface. Occurrence of ink discharge failure can be prevented also for the reason as above.

Specifically, the water-based ink contains the first deliquescent agent in the present embodiment, and accordingly, the adhering ink also contains the first deliquescent agent. The water-based cleaning liquid also contains the second deliquescent agent. Each of the purged ink and the water-based cleaning liquid can accordingly be prevented from being dried on the discharge surface during the wiping operation. As a result, impairment of adhering ink wiping performance can be inhibited in the wiping operation.

The water-based cleaning liquid contains at least one of triethylene glycol and 1,3-propanediol in the present embodiment. Triethylene glycol and 1,3-propanediol each are known as a low-viscosity liquid. When the water-based cleaning liquid in the present embodiment contains at least one of triethylene glycol and 1,3-propanediol, the water-based cleaning liquid can have low viscosity. Impairment of adhering ink wiping performance can be inhibited in the wiping operation also for the reason as above. The deliquescent agents will be described below.

<Deliquescent Agents>

When only one of the water-based ink and the water-based cleaning liquid contains a deliquescent agent, it is thought to be difficult to prevent occurrence of ink discharge failure.

A case in which only the water-based ink rather than both the water-based ink and the water-based cleaning liquid contains a deliquescent agent will be described first. In the above case, the water-based cleaning liquid does not contain the second deliquescent agent, and therefore, the purged ink is hardly absorbed into the water-based cleaning liquid. Consequently, the purged ink hardly enters inside the adhering ink even though the water-based cleaning liquid enters inside the adhering ink.

In the case in which the water-based cleaning liquid does not contain the second deliquescent agent, it is necessary to set the content of the first deliquescent agent in the water-based ink to be greater than 4.0% by mass in order to prevent occurrence of ink discharge failure. However, when the content of the first deliquescent agent in the water-based ink is greater than 4.0% by mass, the first deliquescent agent tends to be localized inside the adhering ink rather than on the surface of the adhering ink when the water-based ink is dried on the discharge surface of the recording head. Accordingly, the purged ink is hardly absorbed into the adhering ink and hardly enters inside the adhering ink. For the reason as above, it is difficult to prevent occurrence of ink discharge failure in a configuration in which only the water-based ink rather than both the water-based ink and the water-based cleaning liquid contains a deliquescent agent see Comparative Example 1 described later).

When the content of the first deliquescent agent in the water-based ink is greater than 4.0% by mass, image density may decrease (see Comparative Example 6 described later).

A case in which only the water-based cleaning liquid rather than both the water-based ink and the water-based cleaning liquid contains a deliquescent agent will be described next. In the above case, the water-based ink does not contain the first deliquescent agent and the adhering ink accordingly does not contain the first deliquescent agent. Consequently, the purged ink is hardly absorbed into the adhering ink with a result that the purged ink hardly enters inside the adhering ink.

In the case in which the water-based ink does not contain the first deliquescent agent, it is necessary to set the content of the second deliquescent agent in the water-based cleaning liquid to be greater than 4.0% by mass in order to prevent occurrence of ink discharge failure. However, when the content of the second deliquescent agent in the water-based cleaning liquid is greater than 4.0% by mass, the viscosity of the water-based cleaning liquid increases. Accordingly, the water-based cleaning liquid hardly enters inside the adhering ink and the purged ink also hardly enters inside the adhering ink. For the reason as above, it is difficult to prevent occurrence of ink discharge failure even in a configuration in which only the water-based cleaning liquid rather than both the water-based ink and the water-based cleaning liquid contains a deliquescent agent (see Comparative Example 2 described later).

As described above, the water-based ink and the water-based cleaning liquid each preferably contain a deliquescent agent. The content of the first deliquescent agent in the water-based ink is preferably at least 1.0% by mass and no greater than 4.0% by mass, and the content of the second deliquescent agent in the water-based cleaning liquid is preferably at least 1.0% by mas and no greater than 4.0% by mass. The following is thought about the lower limits of the respective contents of the deliquescent agents. Specifically, when the content of the first deliquescent agent in the water-based ink is at least 1.0% by mass, a certain content of the first deliquescent agent in the adhering ink can be ensured. A certain amount of the purged ink absorbed into the adhering ink can be accordingly ensured, with a result that a certain amount of the purged ink entered into the adhering ink (amount of purged ink entering inside the adhering ink from the outside of the adhering ink) can be ensured. When the content of the second deliquescent agent in the water-based cleaning liquid is at least 1.0% by mass, a certain amount of the purged ink absorbed into the water-based cleaning liquid can be ensured. A certain amount of the purged ink entering into the water-based cleaning liquid can accordingly be ensured.

In a configuration in which the water-based ink contains two or more first deliquescent agents, the total content of the respective first deliquescent agents in the water-based ink is preferably at least 1.0% by mass and no greater than 4.0% by mass. In a configuration in which the water-based cleaning liquid contains two or more second deliquescent agents, the total content of the second deliquescent agents in the water-based cleaning liquid is preferably at least 1.0% by mass and no greater than 4.0% by mass.

The first and second deliquescent agents may be the same compound or compounds different from each other. The content of the first deliquescent agent in the water-based ink and the content of the second deliquescent agent in the water-based cleaning liquid may be the same or different from each other.

Further description will be made below about a material of the deliquescent agents. The deliquescent agents each include at least one of sorbitol, trimethylolpropane, and 1,3-bis(2-hydroxyethyl)-5,5-dimethylhydantoin. In the above configuration, the deliquescent agents are not chargeable and each are not a polysaccharide. Advantage of preventing occurrence of ink discharge failure can accordingly be easily achieved.

Specifically, the surfaces of the pigment particles each form an electric dual layer as described above in <Typical Configuration of Water-based Ink>. Therefore, use of a charged deliquescent agent (chargeable deliquescent agent) as the first deliquescent agent may generate electric attraction between the chargeable deliquescent agent and the pigment particles. When the water-based ink as above is dried on the discharge surface of the recording head, the chargeable deliquescent agent tends to be present on the surfaces of the pigment particles or the surface of agglomerate of the pigment particles. Accordingly, the chargeable deliquescent agent is hardly present on the surface of the adhering ink. Eventually, the purged ink is hardly absorbed into the adhering ink and hardly enters inside the adhering ink. However, use of the first deliquescent agent, which is not chargeable, can prevent occurrence of such a drawback.

Furthermore, when the adhering ink is in contact with a liquid containing an aqueous solvent (e.g., the water-based cleaning liquid), electrolytic dissociation readily occurs on the surface of the adhering ink. Accordingly, use of a chargeable deliquescent agent as the second deliquescent agent may generate electric attraction between the chargeable deliquescent agent and the surface of the adhering ink. The chargeable deliquescent agent accordingly tends to be present on the surface of the adhering ink. Accordingly, the purged ink hardly enters inside the adhering ink while being absorbed into the chargeable deliquescent agent. However, use of the second deliquescent agent, which is not chargeable, can prevent occurrence of such a drawback.

The polysaccharide refers to multiple polymers of monosaccharides and may be for example starch or glycogen. The viscosity of the polysaccharide is accordingly higher than that of the deliquescent agents. The polysaccharide having such high viscosity may not be wiped and remain on the discharge surface in the wiping operation. Ink discharge failure may occur also for the reason as above. However, use of the first and second deliquescent agents, each of which is not a polysaccharide, can prevent occurrence of such a drawback.

Furthermore, use of a polysaccharide as the second deliquescent agent increases the viscosity of the water-based cleaning liquid, with a result that the water-based cleaning liquid hardly enters inside the adhering ink. Accordingly, the purged ink hardly enters inside the adhering ink. However, use of the second deliquescent agents, which is not a polysaccharide, can prevent occurrence of such a drawback.

The water-based cleaning liquid can be used for cleaning not only the discharge surface but also a blade or a conveyance roller used in the wiping operation. A process of "cleaning the discharge surface" includes removing the adhering ink from the discharge surface.

[Cartridge According to Present Embodiment]

A cartridge according to the present embodiment includes the ink set according to the present embodiment, a first tank that accommodates the water-based ink, and a second tank that accommodates the water-based cleaning liquid. When the cartridge according to the present embodiment is attached to an inkjet recording apparatus, image formation with use of the ink set according to the present embodiment can be easily performed. Image formation can accordingly be performed without involving occurrence of ink discharge failure.

[Image Forming Method According to Present Embodiment]

An image forming method according to the present embodiment includes discharging, supplying, purging, and wiping. In the discharging, a water-based ink is discharged toward a recording medium from a discharge surface of a recording head. In the supplying, a water-based cleaning liquid is supplied to the discharge surface. In the purging, the purging operation is performed. More specifically, the water-based ink (purged ink) is pressurized to be discharged from the discharge surface. In the wiping operation, wiping is performed. More specifically, the discharge surface is wiped. The supplying and the purging are performed after the discharging and before the wiping. The water-based ink and the water-based cleaning liquid are the same as those described above in [Ink set for inkjet recording According to Present Embodiment]. Image formation can be accordingly performed without involving occurrence of ink discharge failure by the image forming method according to the present embodiment.

When image formation is performed using the inkjet recording apparatus to which the water-based ink in the present embodiment is loaded, the discharging, the purging, and the wiping can be performed.

As described above, the water-based cleaning liquid in the present embodiment is supplied to the discharge surface in the supplying. Examples of a method for supplying the water-based cleaning liquid include discharging the water-based cleaning liquid by an inkjet method, applying the water-based cleaning liquid using a roller, and spraying the water-based cleaning liquid.

In the image forming method according to the present embodiment may be formed using an inkjet recording apparatus to which the cartridge according to the present embodiment is attached or with use of the water-based ink and the water-based cleaning liquid that each are separately prepared.

Figure 2:
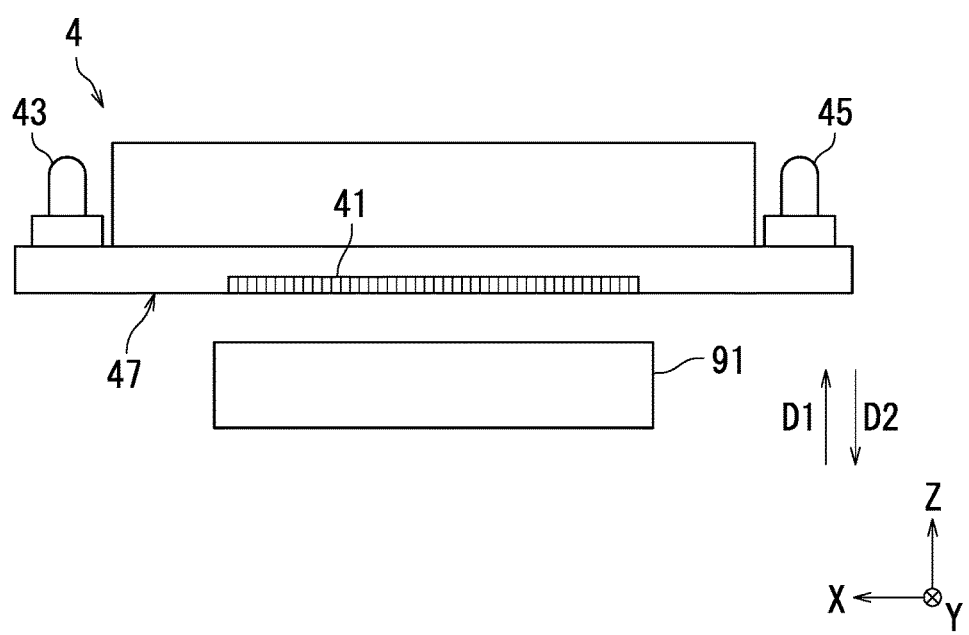
FIG. 2 is an illustration explaining one step of the image forming method according to the present disclosure.
Figure 3:
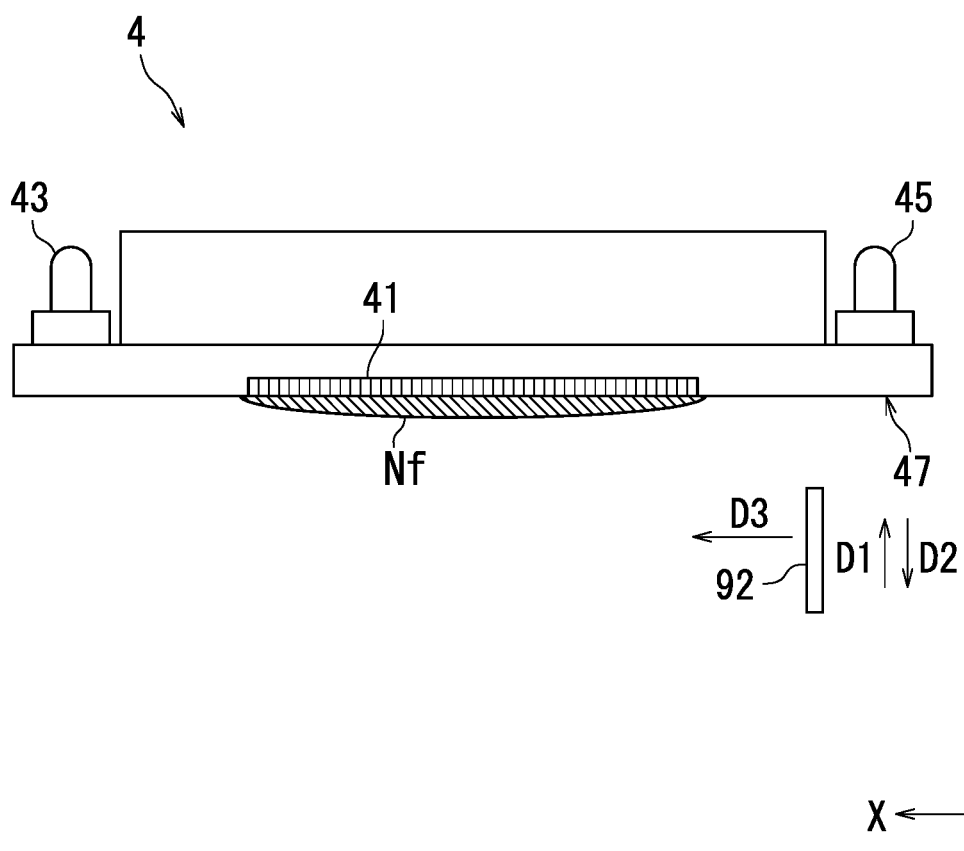
FIG. 3 is an illustration explaining another step of the image forming method according to the present disclosure.

An example of the image forming method according to the present embodiment will be described in detail below with reference to FIGS. 1 to 3. FIG. 1 illustrates an example of configuration of an image forming apparatus to which an image forming method according to the present disclosure is adopted. FIG. 2 is an illustration explaining one step of the image forming method according to the present embodiment, and more specifically, explaining the supplying. FIG. 3 is an illustration explaining another step of the image forming method according to the present embodiment, and more specifically, explaining the purging operation and the wiping operation. The X axis, the Y axis, and the Z axis in each of FIGS. 1 to 3 are perpendicular to one another. Further, FIGS. 2 and 3 each illustrate a main part of the image forming apparatus illustrated in FIG. 1 when viewed from a side.

The configuration of an image forming apparatus 1 illustrated in FIG. 1 will be described first. The image forming apparatus 1 in FIG. 1 includes a sheet feed section 3, a recording head 4, a liquid accommodation section 5, a sheet conveyance section 7, a discharge section 8, and a maintenance unit 9.

The sheet feed section 3 includes sheet feed cassettes 31 and sheet feed rollers 32a. A plurality of recording mediums (e.g., copy paper) S are accommodated in each of the sheet feed cassettes 31 in a stacked manner.

The recording head 4 includes nozzles 41, an ink inlet 43, and an ink outlet 45, as illustrated in FIGS. 2 and 3. The recording head 4 has a discharge surface 47. The nozzles 41 are each open in the discharge surface 47 and discharge the water-based ink toward a recording medium S (see FIG. 1). The water-based ink is accommodated in a first tank 52 (see FIG. 1). The water-based ink flows into the recording head 4 from the first tank 52 through the ink inlet 43 and flows out of the recording head 4 through the ink outlet 45.

The liquid accommodation section 5 includes a cartridge 51, as illustrated in FIG. 1. The cartridge 51 is attachably and detachably attached to the image forming apparatus 1. The cartridge 51 includes the ink set according to the present embodiment, the first tank 52, and a second tank 53. The first tank 52 accommodates the water-based ink in the present embodiment. The second tank 53 accommodates the water-based cleaning liquid in the present embodiment.

The sheet conveyance section 7 includes a first conveyance unit 71 and a second conveyance unit 72. The discharge section 8 includes an exit tray 81.

The maintenance unit 9 includes sponge 91 and a blade 92. The sponge 91 and the blade 92 each are movable between a position opposite to the discharge surface 47 (see FIGS. 2 and 3) and a position opposite to the second conveyance unit 72 (position indicted in FIG. 1). The sponge 91 is movable in an ascending direction D1 and a descending direction D2, as illustrated in FIG. 2. The sponge 91 is impregnated with the water-based cleaning liquid. The water-based cleaning liquid is accommodated in the second tank 53 (see FIG. 1) and supplied from the second tank 53 to the sponge 91. The blade 92 is movable in the ascending direction D1, the descending direction D2, and a wiping direction D3 as illustrated in FIG. 3. The ascending direction D1 herein refers to a direction toward the discharge surface 47 in the Z direction. The descending direction D2 refers to a direction away from the discharge surface 47 in the Z direction. The wiping direction D3 refers to a direction along the discharge surface 47.

In a situation in which an image is formed on a recording medium S using the image forming apparatus 1 illustrated in FIG. 1, one of the sheet feed rollers 32a first picks up an uppermost sheet of the recording mediums S accommodated in corresponding one of the sheet feed cassettes 31 one at a time and feeds the picked recording medium S to the first conveyance unit 71. Once the recording medium S reaches the position facing the discharge surface 47 (see FIG. 2), the water-based ink is discharged from the discharge surface 47 (more specifically, openings of the nozzles 41) toward the recording medium S (discharging). Thereafter, the recording medium S is fed to the second conveyance unit 72 and ejected onto the exit tray 81.

The water-based ink may be attached to the discharge surface 47 in the discharging. When the water-based ink is attached to the discharge surface 47, the water-based ink comes in contact with the air to form adhering ink (not illustrated). In view of the foregoing, the supplying, the purging, and the wiping are performed after the discharging.

The supplying will be described with reference to FIG. 2. The sponge 91 is caused to be impregnated with the water-based cleaning liquid first in the supplying. Next, the sponge 91 is moved to the position opposite to the discharge surface 47 (position indicated in FIG. 2) and then moved in the ascending direction D1 to be pressed against the discharge surface 47. It is preferable that a state in which the sponge 91 is pressed against the discharge surface 47 (also referred to below as a "state of the sponge 91 being pressed") is kept for a specific time period. Alternatively, the sponge 91 may be moved in the ascending direction D1 and the descending direction D2 in a reciprocal manner while being kept in the state of the sponge 91 being pressed. Or, the sponge 91 may be moved in a direction along the discharge surface 47 (X direction in FIG. 2) while being kept in the state of the sponge 91 being pressed.

After elapse of the specific time period, the sponge 91 is moved in the descending direction D2. Then, the supplying ends. After the supplying, the purging is performed.

The purging will be described with reference to FIG. 3. In the purging, the purging operation is performed. In the purging operation, the recording head 4 performs purging. This causes purged ink Nf to be forcedly discharged from the discharge surface 47 (more specifically, the openings of the nozzles 41). After the purging, the wiping is performed.

The wiping will be described with reference to FIG. 3. In the wiping, the wiping operation is performed. In the wiping operation, the blade 92 is moved to the position opposite to the discharge surface 47 (position indicated in FIG. 3) and then moved in the ascending direction D1 to be pressed against the discharge surface 47. The blade 92 is then moved in a direction along the discharge surface 47 (wiping direction D3 indicated in FIG. 3) while being pressed against the discharge surface 47. Through the above movement, the blade 92 removes the adhering ink. The image forming method according to the present embodiment has been described so far with reference to FIGS. 1 to 3. In a situation in which an image is formed on a recording medium S using the image forming apparatus 1 illustrated in FIG. 1, the discharging, the purging, the supplying, and the wiping may be performed in the stated order.

The following describes examples of a material of the water-based ink, a preferable production method of the water-based ink, examples of a material of the water-based cleaning liquid, and a preferable production method of the water-based cleaning liquid in order. The water-based ink is preferably discharged from the discharge surface of the recording head. The water-based cleaning liquid is preferably used for cleaning the discharge surface.

[Examples of Material of Water-Based Ink]

As described above, the water-based ink contains the first deliquescent agent. The first deliquescent agent is one as described above in <Deliquescent agent>. Preferably, the water-based ink contains the first deliquescent agent, a pigment dispersion, and an aqueous solvent. More preferably, the water-based ink contains the first deliquescent agent, the pigment dispersion, the aqueous solvent, and a component C. The component C preferably contains at least one of a surfactant, a solution stabilizer, a moisturizing agent, and a penetrating agent.

<Pigment Dispersion>

The pigment dispersion contains a plurality of pigment particles. The pigment particles each include a pigment core and a resin cover.

(Pigment Core)

The pigment core contains a pigment. Examples of a pigment that can be used include a yellow pigment, an orange pigment, a red pigment, a blue pigment, a violet pigment, and a black pigment. Examples of the yellow pigment include C. I. Pigment Yellow 74, 93, 95, 109, 110, 120, 128, 138, 139, 151, 154, 155, 173, 180, 185, or 193. Examples of the orange pigment include C. I. Pigment Orange 34, 36, 43, 61, 63, or 71. Examples of the red pigment include C. I. Pigment Red 122 or 202. Examples of the blue pigment include C. I. Pigment Blue 15 or 15:3. Examples of the violet pigment include C. I. Pigment Violet 19, 23, or 33. C. I. Pigment Black 7 is an example of the black pigment.

The content of the pigment cores in the water-based ink is preferably at least 4% by mass and no greater than 8% by mass. When the content of the pigment cores in the water-based ink is at least 4% by mass, an image having a desired image density can be easily formed. When the content of the pigment cores in the water-based ink is no greater than 8% by mass, fluidity of the water-based ink can be easily ensured. An image having a desired image density can be easily formed also for the reason as above. Furthermore, permeability of the water-based ink to a recording medium can be easily ensured.

The pigment cores preferably have a volume median diameter ($D_{50}$) of at least 30 nm and no greater than 200 nm. When the volume median diameter ($D_{50}$) of the pigment cores falls in the above range, the color density, hue, or stability of the water-based ink can be improved. More preferably, the pigment cores preferably have a volume median diameter ($D_{50}$) of at least 70 nm and no greater than 130 nm.

(Resin Cover)

The resin cover is disposed on the surface of the pigment core. The resin cover is preferably anionic and preferably made from at least one of styrene-acrylic acid-based resin, styrene-maleic acid copolymer, styrene-maleate half-ester copolymer, vinylnaphthalene-acrylate copolymer, and vinylnaphthalene-maleate copolymer. More preferably, the resin cover is made from a styrene-acrylic acid-based resin. In a configuration in which the resin cover is made from a styrene-acrylic acid-based resin, the pigment particles can be easily produced. Further, dispersibility of the pigment particles can be increased.

The styrene-acrylic acid-based resin is a resin including a unit derived from styrene and a unit derived from acrylic acid, methacrylic acid, acrylic acid ester, or methacrylic acid ester. A preferable styrene-acrylic acid-based resin includes at least one of copolymer of styrene, acrylic acid, and acrylic acid alkyl ester, copolymer of styrene, methacrylic acid, methacrylic acid alkyl ester, and acrylic acid alkyl ester, copolymer of styrene and acrylic acid, copolymer of styrene, maleic acid, and acrylic acid alkyl ester, copolymer of styrene and methacrylic acid, and copolymer of styrene and methacrylic acid alkyl ester. More preferably, the styrene-acrylic acid-based resin is a copolymer of styrene, methacrylic acid, methacrylic acid alkyl ester, and acrylic acid alkyl ester. More specifically, the styrene-acrylic acid-based resin is a copolymer of styrene, methacrylic acid, methyl methacrylate, and butyl acrylate.

The content of the resin cover is preferably at least 15 parts by mass and no greater than 100 parts by mass relative to 100 parts by mass of the pigment cores. An excessively small content of the resin cover may cause strike through in a recording medium after image formation. By contrast, an excessively large content of the resin cover may cause difficulty in attaining a desired image density.

<Aqueous Solvent>

The aqueous solvent preferably contains water and more preferably contains ion-exchanged water. The content of water in the water-based ink is preferably at least 20% by mass and no greater than 70% by mass. When the content of the water falls in the above range, a water-based ink having appropriate viscosity can be provided.

Preferably, the aqueous solvent contains for example ion-exchanged water, either or both of glycerin and glycol, and either or both of alcohol and glycol ether. When the water-based ink contains either or both of glycerin and glycol, a situation in which the water-based ink is dried can be further prevented. When the water-based ink contains either or both of alcohol and glycol ether, permeability of the water-based ink to a recording medium can be increased.

Examples of the glycol ether include diethylene glycol monoethyl ether, triethylene glycol mono-n-butyl ether, triethylene glycol monoisobutyl ether, triethylene glycol monoisopropyl ether, and diethylene glycol mono-n-butyl ether.

<Surfactant>

When the water-based ink contains a surfactant, wettability of the water-based ink to a recording medium increases. The surfactant contained in the water-based ink is preferably a nonionic surfactant. The content of the nonionic surfactant in the water-based ink is preferably at least 0.050% by mass and no greater than 2.0% by mass. When the content of the nonionic surfactant falls in the above range, image density can be increased while image offset can be inhibited.

The nonionic surfactant contained in the water-based ink is preferably acetylene glycol-based surfactant and more specifically, "OLFINE (registered Japanese trademark) E1010" produced by Nissin Chemical Industry Co., Ltd.

<Solution Stabilizer>

When the water-based ink contains a solution stabilizer, components contained in the water-based ink are readily compatibilized, thereby achieving a stable dissolution state of the water-based ink. The solution stabilizer is preferably at least one of 2-pyrrolidone, N-methyl-2-pyrrolidone, and γ-butyrolactone. The content of the solution stabilizer in the water-based ink is preferably at least 1% by mass and no greater than 20% by mass and more preferably at least 3% by mass and no greater than 15% by mass.

<Moisturizing Agent>

When the water-based ink contains a moisturizing agent, volatilization of a liquid component from the water-based ink can be inhibited, thereby attaining stable viscosity of the water-based ink. The moisturizing agent is preferably at least one of polyalkylene glycols, alkylene glycols, and glycerin. Preferable examples of the polyalkylene glycols include polyethylene glycol and polypropylene glycol. Preferable examples of the alkylene glycols include ethylene glycol, propylene glycol, butylene diethylene glycol, dipropylene glycol, trimethylene glycol (1,3-propanediol), triethylene glycol, tripropylene glycol, 1,2,6-hexanetriol, thiodiglycol, 1,3-butanediol, and 1,5-pentanediol. The content of the moisturizing agent in the water-based ink is preferably at least 2% by mass and no greater than 30% by mass and more preferably at least 10% by mass and no greater than 25% by mass.

<Penetrating Agent>

When the water-based ink contains a penetrating agent, permeability of the water-based ink to a recording medium increases. A preferable penetrating agent includes at least one of 1,2-hexylene glycol, 1,2-octanediol, 2,4-diethyl-1,5-pentanediol, 2-butyl-2-ethyl-1,3-propanediol, triethylene glycol monobutyl ether, and diethylene glycol monobutyl ether. The content of the penetrating agent in the water-based ink is preferably at least 0.50% by mass and no greater than 20% by mass.

[Preferable Production Method of Water-Based Ink]

A preferable production method of the water-based ink includes preparing a pigment dispersion solution and mixing the pigment dispersion solution with an additional ink component.

<Preparing Pigment Dispersion Solution>

A material of the resin cover is synthesized first. Specifically, a monomer or prepolymer capable of synthesizing the material of the resin cover through polymerization and a polymerization initiator are added to a specific solvent and the resultant mixture is refluxed by heating at a specific temperature. Through the above process, the material of the resin cover is synthesized. More specifically, styrene, (meth) acrylic acid, (meth)acrylic acid alkyl ester, and the polymerization initiator are added to a mixed liquid of isopropyl alcohol and methyl ethyl ketone and the resultant mixture is refluxed by heating at a temperature of 70° C. Through the above process, a styrene-acrylic acid-based resin is synthesized.

Next, the synthesized resin, the pigment cores, and the aqueous solvent are kneaded together using a media disperser. Through the above kneading, a pigment dispersion solution containing a plurality of pigment particles is obtained. When the particle diameter of a media used in the media disperser (for example, diameter of beads) is changed, the dispersion degree of the pigment particles, amount of resin desorbed in the pigment dispersion solution, or the particle diameter of the pigment particles can be adjusted. For example, the particle diameter of the pigment particles tends to be small as the particle diameter of the media is decreased.

<Mixing Pigment Dispersion Solution with Additional Ink Component>

The pigment dispersion solution obtained as above is mixed with the additional ink component. The pigment dispersion solution and the additional ink component are preferably mixed together using a stirrer (e.g., "THREE-ONE MOTOR (registered Japanese trademark) BL-600" produced by Shinto Scientific Co., Ltd.). An example of the additional ink component is the first deliquescent agent. Preferably, the additional ink component contains the first deliquescent agent and an aqueous solvent. More preferably, the additional ink component contains the first deliquescent agent, the aqueous solvent, and a component C. The component C preferably contains at least one of a surfactant, a solution stabilizer, a moisturizing agent, and a penetrating agent. After the pigment dispersion solution and the additional ink component are mixed together, filtration is performed as necessary. Through the above process, the water-based ink is obtained.

[Examples of Material of Water-Based Cleaning Liquid]

As described above, the water-based cleaning liquid contains the second deliquescent agent, the nonionic surfactant (HLB value: 14 to 16), and the diol. The second deliquescent agent is one as described above in <Deliquescent agent>.

Preferably, the water-based cleaning liquid further contains at least one of the aqueous solvent as described above in <Aqueous Solvent> and the solution stabilizer as described above in <Solution Stabilizer>. When the water-based cleaning liquid contains at least one of them, at least one of the aqueous solvent and the solution stabilizer in the water-based ink is the same as or similar to that in the water-based cleaning liquid. Affinity between the water-based cleaning liquid and the water-based ink can accordingly be increased. The adhering ink herein is formed as a result of the water-based ink being dried. As such, increase in affinity between the water-based cleaning liquid and the water-based ink can increase affinity between the water-based cleaning liquid and the adhering ink. Therefore, the water-based cleaning liquid can readily enter inside the adhering ink further.

<Nonionic Surfactant (HLB value: 14 to 16)>

The nonionic surfactant (HLB value: 14 to 16) is preferably at least one of a first nonionic surfactant having an amino group in a molecule thereof and a second nonionic surfactant having no amino group in a molecule thereof. As described above in <Reason Why Occurrence of Ink Discharge Failure can be Prevented>, even when the nonionic surfactant (HLB value: 14 to 16) has no amino group in a molecule thereof, occurrence of ink discharge failure can be prevented. Preferable examples of the first nonionic surfactant include polyoxyethylene alkylamine and polyoxyethylene cumyl phenyl ether. A preferable example of the second nonionic surfactant is polyoxyethylene nonylphenyl ether.

The polyoxyethylene alkylamine preferably has a structure represented by the following formula (1-1). For example, "AMIET (registered Japanese trademark) 320" produced by Kao Corporation can be used as the polyoxyethylene alkylamine.

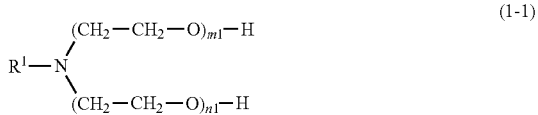
(1-1)

In the above formula (1-1), $R^1$ represents a hydrocarbon group having a carbon number of at least 1 and no greater than 20. Preferably, $R^1$ represents an alkyl group or an alkenyl group having a carbon number of at least 1 and no greater than 20. Also, m1 and n1 each represent an integer satisfying $4 \leq (m1+n1) \leq 20$.

The polyoxyethylene nonylphenyl ether preferably has a structure represented by the following formula (1-2). For example, "NEWCOL (registered Japanese trademark) 566" produced by NIPPON NYUKAZAI CO., LTD. can be used as the polyoxyethylene nonylphenyl ether.

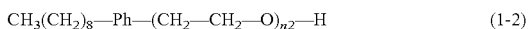
$CH_3(CH_2)_8$—Ph—$(CH_2—CH_2—O)_{n2}$—H (1-2)

In the above formula (1-2), Ph represents a benzene ring. Also, n2 represents an integer of at least 5 and no greater than 15. Preferably, n2 represents 10. The structure represented by the above formula (1-2) includes at least one of an ortho isomer, a meta isomer, and a para isomer.

The content of the nonionic surfactant (HLB value: 14 to 16) in the water-based cleaning liquid is preferably at least 1.0% by mass and no greater than 10% by mass. When the content of the nonionic surfactant (HLB value: 14 to 16) falls in the above range, the surface state of the adhering ink can readily vary, resulting in that a liquid (e.g., the water-based cleaning liquid or the water-based ink) further readily enters inside the adhering ink. In a configuration in which the water-based cleaning liquid contains two or more nonionic surfactants (HLB value: 14 to 16), the total content of the nonionic surfactants (HLB value: 14 to 16) in the water-based cleaning liquid is preferably at least 1.0% by mass and no greater than 10% by mass.

Incidentally, cationic surfactants, anionic surfactants, and zwitterionic surfactants are known as surfactants in addition to nonionic surfactants. However, the water-based cleaning liquid in the present embodiment contains a nonionic surfactant (more specifically, nonionic surfactant (HLB value: 14 to 16)) among the cationic surfactants, the anionic surfactants, the zwitterionic surfactants, and the nonionic surfactants. Containing the nonionic surfactant can reduce effervescence of the water-based cleaning liquid. A low-harm water-based cleaning liquid can be provided. Furthermore, the HLB value can be controlled easily with a result that occurrence of ink discharge failure can be effectively prevented.

<Diol>

The diol includes at least one of triethylene glycol and 1,3-propanediol. Triethylene glycol and 1,3-propanediol each have comparatively low viscosity among diols, more specifically, a viscosity of less than 50 mPa·s. The viscosity of a diol is preferably measured by a method employed in Examples described later or a method equivalent thereto.

The content of the diol in the water-based cleaning liquid is preferably at least 5.0% by mass and no greater than 60% by mass. When the content of the diol is set in the above rage, the viscosity of the water-based cleaning liquid can fall in an appropriate range with a result that adhering ink wiping performance in the wiping operation can be increased. In a configuration in which the water-based cleaning liquid contains two or more diols, the total content of the diols in the water-based cleaning liquid is preferably at least 5.0% by mass and no greater than 60% by mass.

[Preferable Production Method of Water-Based Cleaning Liquid]

A preferable production method of the water-based cleaning liquid includes evenly mixing materials (e.g., the second deliquescent agent, the nonionic surfactant (HLB value: 14 to 16), and the diol) at a specific blending ratio. Preferably, the materials are mixed using a stirrer (e.g., "Three-One Motor BL-600" produced by Shinto Scientific Co., Ltd.).

EXAMPLES

The following describes examples of the present disclosure. Note that unless otherwise stated, evaluation results (e.g., values indicating shape or physical properties) of a powder including a plurality of particles are number averages of values measured with respect to an appropriate number of the particles. In evaluations in which errors may occur, an evaluation value was calculated by calculating the arithmetic mean of an appropriate number of measured values in order to ensure that any errors were sufficiently small.

Adhering ink wiping efficiency and image density were evaluated using ink sets of Examples and Comparative Examples in Evaluations 1 to 5. Among Evaluations 1 to 5, the water-based ink production method was common except constituents of respective water-based inks and the water-based cleaning liquid production method was common except constituents of respective water-based cleaning liquids. Furthermore, the same ink set evaluation method was employed in Evaluations 1 to 5. As such, the following describes aspects of the water-based ink production method common among Evaluations 1 to 5, aspects of the water-based cleaning liquid production method common among Evaluations 1 to 5, and an ink set evaluation method in the stated order. Evaluations 1 to 5 will be described then in order.

[Aspects of Water-Based Ink Production Method Common Among Evaluations 1 to 5]

<Production Method of Pigment Dispersion Solution L1>

Constituents of a pigment dispersion solution L1 used in water-based ink production are listed in Table 1. In Table 1, "resin A-Na" refers to a resin A neutralized with an aqueous sodium hydroxide (NaOH) solution of.

TABLE 1

| Pigment dispersion L1 | |
|---|---|
| Material | Blending ratio (% by mass) |
| Ion-exchanged water | Remainder |
| Resin A-Na | 6.0 |
| Pigment | 15.0 |
| 1,2-octanediol | 0.5 |
| Total | 100.0 |

Constituents of the water-based ink are listed in Table 2. In Table 2, "EO adduct of acetylenediol" refers to "Olfine E1010" produced by Nissin Chemical Industry Co., Ltd. and "EO" refers to ethylene oxide.

TABLE 2

Water-based ink

| Material | Blending ratio (% by mass) |
|---|---|
| Pigment dispersion solution L1 | 40.0 |
| Triethylene glycol mono-n-butyl ether | 3.0 |
| 2-pyrrolidone | 5.0 |
| EO adduct of acetylenediol | 0.5 |
| 1,2-octanediol | 0.7 |
| 1,3-propanediol | 15.0 |
| Compound V | X1 |
| Ion-exchanged water | Remainder |
| Total | 100.0 |

(Synthesis of Resin A)

First of all, the resin A was synthesized. Specifically, a stirrer, a nitrogen inlet tube, a condenser, and a dripping funnel were set at a four-necked flask (capacity: 1,000 mL). Next, 100.0 g of isopropyl alcohol and 300.0 g of methyl ethyl ketone were added to the flask. The flask contents were refluxed by heating at 70° C. under bubbling with nitrogen gas.

Separately, 40.0 g of styrene, 10.0 g of methacrylic acid, 40.0 g of methyl methacrylate, 10.0 g of butyl acrylate, and 0.4 g of azobisisobutyronitrile (AIBN, polymerization initiator) were mixed together to obtain a monomer solution. The monomer solution was added to the flask dropwise over approximately two hours while the flask contents were refluxed by heating at 70° C. After the dripping, the flask contents were refluxed by heating at 70° C. for additional six hours.

A solution containing 0.2 g of AIBN and methyl ethyl ketone was added to the flask dropwise over 15 minutes. After the dripping, the flask contents were refluxed by heating at 70° C. for additional five hours. Through the above process, the resin A (styrene-acrylic acid-based resin) was obtained. The obtained resin A had a mass average molecular weight (Mw) of 20,000 and an acid value of 100 mgKOH/g.

The mass average molecular weight Mw of the resin A was measured under the following conditions using a gel filtration chromatography ("HLC-8020GPC" produced by Tosoh Corporation).
Column: "TSKgel Super Multipore HZ-H" produced by Tosoh Corporation (semi-micron column having an inner diameter 4.6 mm and a length of 15 cm).
Number of columns: three.
Eluent: tetrahydrofuran.
Flow rate: 0.35 mL/min.
Sample amount: 10 μL.
Temperature at measurement: 40° C.
Detector: infrared detector.

Seven TSKgel standard polystyrenes produced by Tosoh Corporation, namely F-40, F-20, F-4, A-5000, A-2500, and A-1000 and n-propylbenzene were selected to prepare calibration curves.

The acid value of the resin A was determined in accordance with a method described in "Japan Industrial Standard (JIS) K0070-1992 (Test methods for acid value, saponification value, ester value, iodine value, hydroxyl value, and unsaponifiable matter of chemical products)".

<Preparation of Pigment Dispersion Solution L1>

Next, the pigment dispersion solution L1 was prepared with the use of the synthesized resin A. Specifically, 6.0% by mass of the resin A, 15.0% by mass of Phthalocyanine Blue 15:3 ("LIONOL (registered Japanese trademark) Blue FG-7330" produced by TOYO INK CO., LTD), 0.5% by mass of 1,2-octanediol, and ion-exchanged water (remainder) were loaded into a vessel (capacity: 0.6 L) of a media disperser ("DYNO-MILL" produced by Willy A. Bachofen AG (Willy A. Bachofen AG)).

Furthermore, an amount of an aqueous sodium hydroxide solution that is necessary to neutralize the resin A was added to the vessel. The aqueous NaOH solution was added to the vessel herein to set the pH of the vessel contents to 8. More specifically, a mass of the aqueous NaOH solution that was 1.1 times a neutralization equivalent was added to the vessel. In determining the blending ratio of the materials of the pigment dispersion solution L, the mass of Na to be added to the vessel was added to the mass of the resin A. The mass of water contained in the aqueous NaOH solution and the mass of water generated through neutralization reaction were added to the mass of ion-exchanged water.

A medium (zirconia beads having a diameter of 0.5 mm) was loaded into the vessel until the amount of the medium was 70% by volume relative to the capacity of the vessel. The vessel contents were kneaded using a media disperser while the vessel was water-cooled under conditions of a temperature of 10° C. and a peripheral speed of 8 m/sec. so that pigment particles had a volume median diameter ($D_{50}$) of at least 70 nm and no greater than 130 nm. Through the above process, the pigment dispersion solution L1 was obtained.

The volume median diameter ($D_{50}$) of the pigment particles was measured based on Coulter principle (electrical sensing zone technique) using "Coulter Counter Multisizer 3" produced by Beckman Coulter, Inc.

(Mixing of Pigment Dispersion Solution L1 with Additional Ink Component)

The materials listed in Table 2 were added to a beaker at a blending ratio indicated in Table 2. The beaker contents were stirred at a rotational speed of 400 rpm using a stirrer ("Three-One Motor BL-600" produced by Shinto Scientific Co., Ltd.) to evenly mix the beaker contents. The resultant mixed liquid was filtered using a filter (pore diameter: 5 μm) to remove foreign matter and coarse particles contained in the mixed liquid. Through the above process, a water-based ink was obtained. The materials and the blending ratio X1 of the compound V are indicated in Evaluations 1 to 5 which will be described later.

[Aspects of Water-Based Cleaning Liquid Production Method Common Among Evaluations 1 to 5]

Table 3 indicates constituents of the water-based cleaning liquid.

Specifically, the materials listed in Table 3 were added to a beaker at a blending ratio indicated in Table 3. The beaker contents were stirred at a rotational speed of 400 rpm using a stirrer ("Three-One Motor BL-600" produced by Shinto Scientific Co.) to evenly mix the beaker contents. Through the above, a water-based cleaning liquid was obtained. The materials and the blending ratio X2 of the compound W, the materials and the blending ratio Y2 of the nonionic surfactant, the materials and the blending ratio Z2 of the diol were indicated in Evaluations 1 to 5 which will be described later.

TABLE 3

Water-based cleaning liquid

| Materials | Blending ratio (% by mass) |
| --- | --- |
| Triethylene glycol mono-n-butyl ether | 10.0 |
| 2-pyrrolidone | 10.0 |
| Compound W | X2 |
| Nonionic surfactant | Y2 |
| Diol | Z2 |
| Ion-exchanged water | Remainder |
| Total | 100.0 |

[Evaluation Methods]
<Evaluation of Adhering Ink Wiping Efficiency>

Adhering ink wiping efficiency was evaluated according to the following method.

Specifically, an evaluation apparatus was prepared first. The evaluation apparatus used was an inkjet recording apparatus (prototype evaluation apparatus produced by KYOCERA Document Solutions Inc.) including a recording head (line head). The evaluation apparatus included nozzles forming a nozzle surface (corresponding to a discharge surface of a recording head). The nozzle surface had been cleaned and accordingly was not contaminated with ink.

Next, 0.1 g of a sample (water-based ink of one of Examples and Comparative Examples) was put on an edge of a blade of the evaluation apparatus and the blade in the above state was allowed to stand for ten minutes in an environment of a temperature of approximately 25° C. and a relative humidity of approximately 60%. Thereafter, the edge of the blade was caused to wipe the nozzle surface (forward wiping). Through the wiping, an ink film was formed on the nozzle surface. The recording head having the nozzle surface on which the ink film had been formed was allowed to stand for four days in an environment of a temperature of 40° C. and a relative humidity of 15%. Thereafter, a sheet (cut product of "BEMCOT (registered Japanese trademark) M-3II" produced by Asahi Kasei Corp., larger in size than the nozzle surface) with which 3 g of a water-based cleaning liquid (water-based cleaning liquid included in an ink set of one of Examples and Comparative Examples) had been impregnated was prepared and allowed to be in contact with the nozzle surface for 30 seconds. After elapse of one minute, the edge of the blade was cause to wipe the nozzle surface (backward wiping). The nozzle surface was visually observed to confirm presence or absence of ink contamination for evaluation of ink wiping efficiency.

A nozzle surface on which no ink contamination was observed was evaluated as being excellent in adhering ink wiping efficiency (Good). A nozzle surface on which ink contamination was observed was evaluated as being not excellent in adhering ink wiping efficiency (Poor).

<Evaluation of Image Density>

Image density was evaluated according to the following method.

Specifically, an evaluation apparatus was prepared first. The evaluation apparatus used was an inkjet recording apparatus (prototype evaluation apparatus produced by KYOCERA Document Solutions Inc.) including four recording heads (four line heads). One of the recording heads of the evaluation apparatus was loaded with a sample (water-based ink of one of Examples and Comparative Examples). The evaluation apparatus was adjusted so that the amount of ink discharged from the recording head per one droplet was 11 pL.

Next, a solid image (size: 10 cm×10 cm, printing rate: 100%) was formed on a recording sheet ("C2" produced by Fuji Xerox Co., Ltd., A4-size plain paper) at a recording speed of 150 pieces/min. using the evaluation apparatus in an environment at a temperature of 25° C. and a relative humidity of 60%. Subsequently, the sheet on which the image had been formed was allowed to stand for 24 hours in an environment at a temperature of 25° C. and a relative humidity of 60%. The image densities of ten points in the image was then measured using a reflectance densitometer ("RD-19" available at SAKATA INX ENG CO., LTD.). The arithmetic mean of the measured ten image densities was determined as an evaluation value.

An evaluation value of at least 1.10 was evaluated as being excellent in image density. An evaluation value of less than 1.10 was evaluated as being not excellent in image density.

[Evaluation 1]

Ink sets S-1 to S-4 were evaluated in Evaluation 1. Table 4 indicates constituents and evaluation results of the ink sets S-1 to S-4.

The respective blending ratios are indicated in the unit of percent by mass in Table 4, Further, "X-a" refers to sorbitol. Moreover, "nonionic surfactant (HLB value: 15.4)" refers to "AMIET 320" produced by Kao Corporation.

TABLE 4

| | | Example 1 | Comparative Example 1 | Comparative Example 2 | Comparative Example 3 |
| --- | --- | --- | --- | --- | --- |
| Ink set | | S-1 | S-2 | S-3 | S-4 |
| Water-based ink | | B-1 | B-1 | B-2 | B-2 |
| Compound V | Material | X-a | | None | |
| | Blending ratio X1 | 2.0 | | 0.0 | |
| Water-based cleaning liquid | | C-1 | C-2 | C-1 | C-2 |
| Compound W | Material | X-a | None | X-a | None |
| | Blending ratio X2 | 2.0 | 0.0 | 2.0 | 0.0 |
| Surfactant | Material | Nonionic surfactant (HLB value: 15.4) | | | |
| | Blending ratio Y2 | 1.0 | | | |
| Diol | Material | 1,3-propanediol | | | |
| | Blending ratio Z2 | 30.0 | | | |
| Evaluation result | | | | | |
| Wiping efficiency | | Good | Poor | Poor | Poor |
| Image density | | 1.15 | 1.13 | 1.14 | 1.14 |

At least one of presence and absence of the compound V in the water-based ink and presence and absence of the compound W in the water-based cleaning liquid is different among the ink sets S-1 to S-4. Specifically, a water-based ink B-1 contained the compound V while a water-based ink B-2 did not contain the compound V. The compound V was sorbitol. The blending ratio X1 of the compound V in the water-based ink B-1 was 2.0% by mass.

A water-based cleaning liquid C-1 contained the compound W while the water-based cleaning liquid C-2 did not contain the compound W. The compound W was sorbitol. The blending ratio X2 of the compound W in the water-based cleaning liquid C-1 was 2.0% by mass.

The water-based cleaning liquids C-1 and C-2 each contained a nonionic surfactant (HLB value: 15.4, "AMIET 320" produced by Kao Corporation) as a surfactant. The blending ratio Y2 of the nonionic surfactant in each of the water-based cleaning liquids C-1 and C-2 was 1.0% by mass. The water-based cleaning liquids C-1 and C-2 each contained 1,3-propanediol as a diol. The blending ratio Z2 of the diol in each of the water-based cleaning liquids C-1 and C-2 was 30.0% by mass.

[Evaluation 2]

The ink set S-1 and ink sets S-5 to S-9 were evaluated in Evaluation 2. Table 5 indicates constituents and evaluation results of the respective ink sets S-1 and S-5 to S-9.

The respective blending ratios are indicated in the unit of percent by mass in Table 5. Further, "X-a", "X-b", "X-c", and "X-d" each are as listed in Table 6. Furthermore, "nonionic surfactant (HLB value: 15.4) refers to "AMIET 320" produced by Kao Corporation.

TABLE 5

|  |  | Examples |  |  |  |  | Comparative Example 4 |
|---|---|---|---|---|---|---|---|
|  |  | 1 | 2 | 3 | 4 | 5 |  |
| Ink set |  | S-1 | S-5 | S-6 | S-7 | S-8 | S-9 |
| Water-based ink |  | B-1 | B-3 | B-4 | B-1 | B-3 | B-5 |
| Compound V | Material | X-a | X-b | X-c | X-a | X-b | X-d |
|  | Blending ratio X1 |  |  | 2.0 |  |  |  |
| Water-based cleaning liquid |  | C1 | C-3 | C-4 | C-3 | C-1 | C-5 |
| Compound W | Material | X-a | X-b | X-c | X-b | X-a | X-d |
|  | Blending ratio X2 |  |  | 2.0 |  |  |  |
| Surfactant | Material | Nonionic surfactant (HLB value: 15.4) |  |  |  |  |  |
|  | Blending ratio Y2 | 1.0 |  |  |  |  |  |
| Diol | Material | 1,3-propanediol |  |  |  |  |  |
|  | Blending ratio Z2 | 30.0 |  |  |  |  |  |
| Evaluation result |  |  |  |  |  |  |  |
| Wiping efficiency |  | Good | Good | Good | Good | Good | Poor |
| Image density |  | 1.15 | 1.12 | 1.13 | 1.13 | 1.12 | 1.14 |

TABLE 6

| Material of Compound V and Compound W | |
|---|---|
| X-a | Sorbitol |
| X-b | Trimethylolpropane |
| X-c | 1,3-bis(2-hydroxyethyl)-5,5-dimethylhydantoin |
| X-d | Sodium glutamate |

At least one of the materials of the compound V in the water-based ink and the materials of the compound W in the water-based cleaning liquid is different among the ink sets S-1 and S-5 to S-9. Specifically, the blending ratio X1 of the compound V in each of the water-based ink B-1 and B-3 to B-5 was 2.0% by mass. The water-based ink B-1 contained sorbitol as the compound V. The water-based ink B-3 contained trimethylol propane as the compound V. The water-based ink B-4 contained 1,3-bis(2-hydroxyethyl)-5,5-dimethylhydantoin as the compound V. The water-based ink B-5 contained sodium glutamate as the compound V.

The blending ratio X2 of the compound W in each of the water-based cleaning liquids C-1 and C-3 to C-5 was 2.0% by mass. The water-based cleaning liquid C-1 contained sorbitol as the compound W. The water-based cleaning liquid C-3 contained trimethylolpropane as the compound W. The water-based cleaning liquid C-4 contained 1,3-bis(2-hydroxyethyl)-5,5-dimethylhydantoin as the compound W. The water-based cleaning liquid C-5 contained sodium glutamate as the compound W.

The water-based cleaning liquids C-1 and C-3 to C-5 each contained a nonionic surfactant (HLB value: 15.4, "AMIET 320" produced by Kao Corporation) as a surfactant. The blending ratio Y2 of the nonionic surfactant in each of the water-based cleaning liquids C-1 and C-3 to C-5 was 1.0% by mass. The water-based cleaning liquids C-1 and C-3 to C-5 each contained 1,3-propanediol as a diol. The blending ratio Z2 of the diol in each of the water-based cleaning liquids C-1 and C-3 to C-5 was 30.0% by mass.

[Evaluation 3]

Ink sets S-10 to S-16 were evaluated in Evaluation 3. Table 7 indicates constituents and evaluation results of the respective ink sets S-10 to S-16.

The respective blending ratios are indicated in the unit of percent by mass in Table 7. Furthermore, "nonionic surfactant (HLB value: 15.4) refers to "AMIET 320" produced by Kao Corporation.

TABLE 7

|  |  | Comparative Example 5 | Examples |  |  |  |  | Comparative Example 6 |
|---|---|---|---|---|---|---|---|---|
|  |  |  | 6 | 7 | 8 | 9 | 10 |  |
| Ink set |  | S-10 | S-11 | S-12 | S-13 | S-14 | S-15 | S-16 |
| Water-based ink |  | B-6 | B-7 | B-8 | B-9 | B-10 | B-11 | B-12 |
| Compound V | Material |  |  |  | Sorbitol |  |  |  |
|  | Blending ratio X1 | 0.8 | 1.2 | 2.6 | 3.8 | 3.6 | 2.4 | 4.2 |
| Water-based cleaning liquid |  | C-6 | C-7 | C-8 | C-9 | C-10 | C-11 | C-12 |
| Compound W | Material |  |  |  | Sorbitol |  |  |  |
|  | Blending ratio X2 | 0.8 | 1.2 | 2.6 | 3.8 | 2.4 | 3.6 | 4.2 |

TABLE 7-continued

| | | Comparative Example 5 | Examples 6 | 7 | 8 | 9 | 10 | Comparative Example 6 |
|---|---|---|---|---|---|---|---|---|
| Surfactant | Material | | | Nonionic surfactant (HLB value: 15.4) | | | | |
| | Blending ratio Y2 | | | 1.0 | | | | |
| Diol | Material | | | 1,3-propanediol | | | | |
| | Blending ratio Z2 | | | 30.0 | | | | |
| Evaluation result | | | | | | | | |
| Wiping efficiency | | Poor | Good | Good | Good | Good | Good | Poor |
| Image density | | 1.13 | 1.13 | 1.12 | 1.13 | 1.14 | 1.13 | 1.06 |

At least one of the blending ratio X1 of the compound V and the blending ratio X2 of the compound W is different among the ink sets S-10 to S-16. Specifically, the water-based inks B-6 to B-12 each contained sorbitol as the compound V. The blending ratios X1 of the compound V in the respective water-based inks B-6 to B-12 were as indicated in Table 7, The water-based cleaning liquids C-6 to C-12 each contained sorbitol as the compound W. The blending ratios X2 of the compound W in the respective water-based cleaning liquids C-6 to C-12 were as indicated in Table 7.

The water-based cleaning liquids C-6 to C-2 each contained a nonionic surfactant (HLB value: 15.4, "AMIET 320" produced by Kao Corporation) as a surfactant. The blending ratio Y2 of the nonionic surfactant in each of the water-based cleaning liquids C-6 to C-12 was 1.0% by mass. The water-based cleaning liquids C-6 to C-12 each contained 1,3-propanediol as a diol. The blending ratio Z2 of the diol in each of the water-based cleaning liquids C-6 to C-12 was 30.0% by mass.

[Evaluation 4]

The ink set S-1 and ink sets S-17 to S-21 were evaluated in Evaluation 4. Table 8 indicates constituents and evaluation results of the respective ink sets S-1 and S-17 to S-21.

The respective blending ratios are indicated in the unit of percent by mass in Table 8. Further, "Y-a", "Y-b", "Y-c", and "Y-d" each are as listed in Table 9.

TABLE 8

| | | Comparative Example 7 | Examples 1 | 11 | 12 | 13 | Comparative Example 8 |
|---|---|---|---|---|---|---|---|
| Ink set | | S-17 | S-1 | S-18 | S-19 | S-20 | S-21 |
| Water-based ink | | | | B-1 | | | |
| Compound W | Material | | | Sorbitol | | | |
| | Blending ratio X1 | | | 2.0 | | | |
| Water-based cleaning liquid | | C-13 | C-1 | C-14 | C-15 | C-16 | C-17 |
| Compound W | Material | | | Sorbitol | | | |
| | Blending ratio X2 | | | 2.0 | | | |
| Surfactant | Material | Y-a | Y-c | Y-c | Y-c | Y-b | Y-d |
| | HLB value | 13.3 | 15.4 | 15.4 | 15.4 | 14.1 | 16.3 |
| | Blending ratio Y2 | 1.0 | 1.0 | 3.0 | 7.0 | 1.0 | 1.0 |
| Diol | Material | | | 1,3-propanediol | | | |
| | Blending ratio Z2 | | | 30.0 | | | |
| Evaluation result | | | | | | | |
| Wiping efficiency | | Poor | Good | Good | Good | Good | Poor |
| Image density | | 1.15 | 1.15 | 1.15 | 1.15 | 1.15 | 1.15 |

TABLE 9

| | Material of nonionic surfactant |
|---|---|
| Y-a | "NEWCOL 565" (HLB value: 13.3) produced by NIPPON NYUKAZAI CO., LTD. |
| Y-b | "NEWCOL 566" (HLB value: 14.1) produced by NIPPON NYUKAZAI CO., LTD. |
| Y-c | "AMIET 320" (HLB value: 15.4) produced by Kao Corporation |
| Y-d | "NEWCOL 25" (HLB value: 16.3) produced by NIPPON NYUKAZAI CO., LTD. |

At least one of the material and the blending ratio Y2 of the nonionic surfactant in the water-based cleaning liquid is different among the ink sets S-1 and S-17 to S-21. Specifically, the water-based cleaning liquid C-13 contained a nonionic surfactant (HLB value: 13.3, "NEWCOL 565" produced by NIPPON NYUKAZAI CO., LTD.) as a surfactant. The blending ratio Y2 of the nonionic surfactant in the water-based cleaning liquid C-13 was 1.0% by mass. The water-based cleaning liquids C-1, C-14, and C-15 each contained a nonionic surfactant (HLB value: 15.4, "AMIET 320" produced by Kao Corporation) as a surfactant. The blending ratios Y2 of the nonionic surfactant in the respective water-based cleaning liquids C-1, C-14, and C-15 were as indicated in Table 8. The water-based cleaning liquid C-16 contained a nonionic surfactant (HLB value: 14.1, "NEWCOL 566" produced by NIPPON NYUKAZAI CO., LTD.) as a surfactant. The blending ratio Y2 of the nonionic surfactant in the water-based cleaning liquid C-16 was 1.0% by mass. The water-based cleaning liquid C-17 contained a nonionic surfactant (HLB value: 16.3, "NEWCOL 25" produced by NIPPON NYUKAZAI CO., LID.) as a surfactant. The blending ratio Y2 of the nonionic surfactant in the water-based cleaning liquid C-17 was 1.0% by mass.

The water-based cleaning liquids C-1 and C-13 to C-17 each contained sorbitol as the compound W. The blending ratio X2 of the compound W in each of the water-based cleaning liquids C-1 and C-13 to C-17 was 2.0% by mass. The water-based cleaning liquids C-1 and C-13 to C-17 each contained 1,3-propanediol as a diol. The blending ratio Z2 of the diol in each of the water-based cleaning liquids C-1 and C-13 to C-17 was 30.0% by mass.

[Evaluation 5]

The ink set S-1 and ink sets S-22 to S-25 were evaluated in Evaluation 5. Table 10 indicates constituents and evaluation results of the respective ink sets S-1 and S-22 to S-25.

The respective blending ratios are indicated in the unit of percent by mass in Table 10. Also, respective viscosities were indicated in the unit of mPa·s. Furthermore, "nonionic surfactant (HLB value: 14.1)" refers to "NEWCOL 566" produced by NIPPON NYUKAZAI CO., LTD. Moreover, "Z-a", "Z-b", and "Z-c" each are as indicated in Table 11. The viscosity of each diol (see table 10) was measured in accordance with the method described in "JIS Z 8803:2011 (Methods for viscosity measurement of liquid).

At least one of the material and the blending ratio Z2 of the diol in the water-based cleaning liquid is different among the ink sets S-1 and S-22 to S-25. Specifically, the water-based cleaning liquids C-1, C-18, and C-19 each contained 1,3-propanediol as a diol. The blending ratios Z2 of the diol in the respective water-based cleaning liquids C-1, C-18, and C-19 were as listed in Table 10. The water-based cleaning liquid C-20 contained triethylene glycol as a diol. The blending ratio Z2 of the diol in the water-based cleaning liquid C-20 was 30.0% by mass. The water-based cleaning liquid C-21 contained propylene glycol as a diol. The blending ratio Z2 of the diol in the water-based cleaning liquid C-21 was 30.0% by mass.

The water-based cleaning liquids C-1 and C-18 to C-21 each contained sorbitol as the compound W. The blending ratio X2 of the compound W in each of the water-based cleaning liquids C-1 and C-18 to C-21 was 2.0% by mass. The water-based cleaning liquids C-1 and C-18 to C-21 each contained a nonionic surfactant (HLB value: 14.1, "NEW-COL 566" produced by NIPPON NYUKAZAI CO., LTD.) as a surfactant. The blending ratio Y2 of the nonionic surfactant in each of the water-based cleaning liquids C-1 and C-18 to C-21 was 1.0% by mass.

According to Evaluations 1 to 5 as above, the ink sets of Examples 1 to 16 each included a water-based ink and a water-based cleaning liquid. The water-based ink and the water-based cleaning liquid each contained at least 1.0% by mass and no greater than 4.0% by mass of a deliquescent agent. The water-based cleaning liquid further contained a nonionic surfactant and a diol. The deliquescent agent that the water-based ink contained and the deliquescent agent that the water-based cleaning liquid contained each were at least one of sorbitol, trimethylolpropane, and 1,3-bis(2-hydroxyethyl)-5,5-dimethylhydantoin. The nonionic surfactant had an HLB value determined by Griffin method of at least 14 and no greater than 16. The diol was at least one of triethylene glycol and 1,3-propanediol. In the above configuration, the ink sets of Examples 1 to 16 each were excellent in adhering ink wiping efficiency. Images formed with the use of the respective ink sets of Examples 1 to 16 were excellent in image density.

TABLE 10

| | | Examples | | | Comparative |
|---|---|---|---|---|---|
| | 1 | 14 | 15 | 16 | Example 9 |
| ink set | S-1 | S-22 | S-23 | S-24 | S-25 |
| Water-based ink | | | B-1 | | |
| Compound V Material | | | Sorbitol | | |
| Blending ratio X1 | | | 2.0 | | |
| Water-based cleaning liquid | C-1 | C-18 | C-19 | C-20 | C-21 |
| Compound W Material | | | Sorbitol | | |
| Blending ratio X2 | | | 2.0 | | |
| Surfactant Material | | Nonionic surfactant (HLB value: 14.1) | | | |
| Blending ratio Y2 | | | 1.0 | | |
| Diol Material | Z-a | Z-a | Z-a | Z-b | Z-c |
| Viscosity | 42.0 | 42.0 | 42.0 | 46.0 | 50.0 |
| Blending ratio Z2 | 30.0 | 10.0 | 50.0 | 30.0 | 30.0 |
| Evaluation result | | | | | |
| Wiping efficiency | Good | Good | Good | Good | Poor |
| Image density | 1.15 | 1.15 | 1.15 | 1.15 | 1.15 |

TABLE 11

| Material of diol |  |
|---|---|
| Z-a | 1,3-propanediol |
| Z-b | Triethylene glycol |
| Z-c | Propylene glycol |

What is claimed is:

1. An ink set for inkjet recording comprising a water-based ink and a water-based cleaning liquid, wherein
the water-based ink and the water-based cleaning liquid each contain at least 1.0% by mass and no greater than 4.0% by mass of a deliquescent agent,
the water-based cleaning liquid further contains a nonionic surfactant and a diol,
the deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin,
the nonionic surfactant has an HLB value determined by Griffin method of at least 14 and no greater than 16, and
the diol includes at least one of triethylene glycol and 1,3-propanediol.

2. The ink set for inkjet recording according to claim 1, wherein
the nonionic surfactant includes at least one of a first nonionic surfactant having an amino group in a molecule thereof and a second nonionic surfactant having no amino group in a molecule thereof,
the first nonionic surfactant is polyoxyethylene alkylamine represented by the following formula (1-1), and the second nonionic surfactant is polyoxyethylene nonylphenyl ether represented by the following formula (1-2):

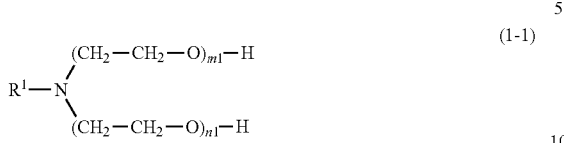 (1-1)

where in the formula (1-1), $R^1$ represents a hydrocarbon group having a carbon number of at least 1 and no greater than 20, and m1 and n1 each represent an integer satisfying $4 \leq (m1+n1) \leq 20$, $$CH_3(CH_2)_8—Ph—(CH_2—CH_2—O)_{n2}—H \qquad (1\text{-}2)$$

where in the formula (1-2), Ph represents a benzene ring, and n2 represents an integer of at least 5 and no greater than 15.

3. The ink set for inkjet recording according to claim 2, wherein
in the formula (1-1), $R^1$ represents an alkyl group or an alkenyl group having a carbon number of at least 1 and no greater than 20.

4. The ink set for inkjet recording according to claim 2, wherein
in the formula (1-2), n2 represents 10.

5. The ink set for inkjet recording according to claim 1, wherein
the water-based ink is discharged from a discharge surface of a recording head, and
the water-based cleaning liquid is used for cleaning the discharge surface.

6. A cartridge comprising:
the ink set for inkjet recording according to claim 1;
a first tank that accommodates the water-based ink; and
a second tank that accommodates the water-based cleaning liquid.

7. An image forming method comprising:
discharging a water-based ink toward a recording medium from a discharge surface of a recording head;
supplying a water-based cleaning liquid to the discharge surface;
performing purging in a manner that the water-based ink is pressurized to he discharged from the discharge surface; and
wiping the discharge surface, wherein
the supplying and the purging are performed after the discharging and before the wiping,
the water-based ink and the water-based cleaning liquid each contain at least 1.0% by mass and no greater than 4.0% by mass of a deliquescent agent,
the water-based cleaning liquid further contains a nonionic surfactant and a diol,
the deliquescent agent that the water-based ink contains and the deliquescent agent that the water-based cleaning liquid contains each include at least one of sorbitol, trimethylolpropane, and 1,3-bis(2-hydroxyethyl)-5,5-dimethylhydantoin,
the nonionic surfactant has an HLB value determined by Griffin method of at least 14 and no greater than 16, and
the diol includes at least one of triethylene glycol and 1,3-propanediol.

* * * * *